May 1, 1928.

R. C. WILSON

RESILIENT COUPLING

Filed July 21, 1927     2 Sheets-Sheet 1

Inventor:
Raymond C. Wilson
By his Attorneys
Redding, Greeley, O'Shea & Campbell Inventor:
Raymond C. Wilson
By his Attorneys
Redding, Greely, O'Shea & Campbell Patented May 1, 1928.

1,668,134

UNITED STATES PATENT OFFICE.

RAYMOND C. WILSON, OF NEW YORK, N. Y., ASSIGNOR TO INTERNATIONAL MOTOR COMPANY, OF NEW YORK, N. Y., A CORPORATION OF DELAWARE.

RESILIENT COUPLING.

Application filed July 21, 1927. Serial No. 207,440.

This invention relates in general to a resilient coupling or universal joint, of the kind disclosed in pending application Serial No. 29,682 of August H. Leipert, in which tortional stresses are transmitted between rotatable elements through yielding non-metallic material which serves to cushion or absorb to a degree the shocks and stresses ordinarily set up in the transmission of driving torque between the respective elements. In the said pending application there is disclosed a construction involving the use of blocks of yielding non-metallic material, which may be retained under compression and through which driving forces are transmitted, which shall be practical from the standpoint of manufacture, ease of assembly and disassembly and efficient in use. Blocks of yielding non-metallic material are retained between seats carried with arms upon the respective elements between which driving forces are to be transmitted, which seats are readily removable from the arms in the interest of ease of assembly of the blocks.

The blocks used in accordance with the invention set forth in the said pending application are solid blocks of yielding non-metallic material. But it has been found that, in transmitting torque between shafts which are subject to frequent or periodic axial deflections, the cross-sectional area of the solid blocks in planes passing through the axes of the shafts, which it is necessary to provide in order successfully to transmit torque and yieldingly resist twisting stresses, is too great to permit the shafts to accommodate stresses tending to deflect them from their normal angular alignment. It is, therefore, proposed, according to the present invention, to form each of the blocks of what may be termed two parallel columns joined by a web. The blocks are placed between the arms of the coupling in such a manner that the ends of the columns are maintained between the surfaces of the seats. Thus, the cross-sectional area of the blocks in any plane passing through the axes of the shafts will be made up of the sum of the cross-sectional areas of the two columns. Assuming each column to have a cross-sectional area of one square inch, the total cross-sectional area of the block will be two square inches, which is the equivalent of a solid block having a cross-sectional area of two square inches as far as resisting twisting stresses is concerned. But it has been found that the resistance of the split block to deflections between the axes of the shafts varies as the sum of the squares of the cross-sectional areas of the two columns, which, in the assumed case, would be $1^2+1^2=2$. The resistance of the solid block, on the other hand, varies as the square of its cross-sectional area, which, in the assumed case, would be $2^2=4$. It will be apparent, therefore, that it is highly desirable to form the blocks of double columns as above set forth and it is an object of this invention to provide such blocks.

It is a further object of the invention to provide suitable seats for such split or double column blocks.

Still a further object is the provision of means whereby two seats may be carried as a unit with each of the arms on the respective shafts.

These and other objects of the invention will appear more fully in the following detailed description, wherein reference is made to the accompanying drawings, in which.

It will be understood in connection with the following description that, although one of the relatively movable members is referred to throughout as the driving member while the other member to which it is connected by the resilient coupling is referred to throughout as the driven member, this distinction is arbitrary and either of the relatively movable members may be the driving member or the driven member.

A driving member $a$ is provided with a flange $a'$ for attachment to a co-operating flange on a transmission shaft or the like. The driving member $a$ is provided with a plurality of arms $a^3$ or extensions shown, in the illustrated embodiment, as two in number diametrically disposed with respect to one another. These arms are turned at their ends to cylindrical form as at $a^{3x}$ and have key-ways $a^4$ milled therein for the reception of keys $a^5$ adapted to position the seats for the blocks of yielding non-metallic material in a manner which will be described hereinafter. The driving member $a$ is formed interiorly with a cylindrical recess $a^6$ and centrally of the arms it is formed with a seat portion $a^7$ to receive a race $a^8$ forming part of a centering device for the resilient coupling. The driven member is also provided with a pair of diametrically disposed arms $c'$ mounted thereon by means of the nut $n$ and the key $n'$. The arms $c'$ are turned at their ends as at $c^2$ and milled for key-ways in a manner similar to the arms $a^3$. Inwardly of the arms $c'$ the hub $c^3$, is turned as at $c^4$ to receive a spherical centering ring $d$ which is secured by means of a collar $k$ bolted to the driving member $a$.

Figure 1:
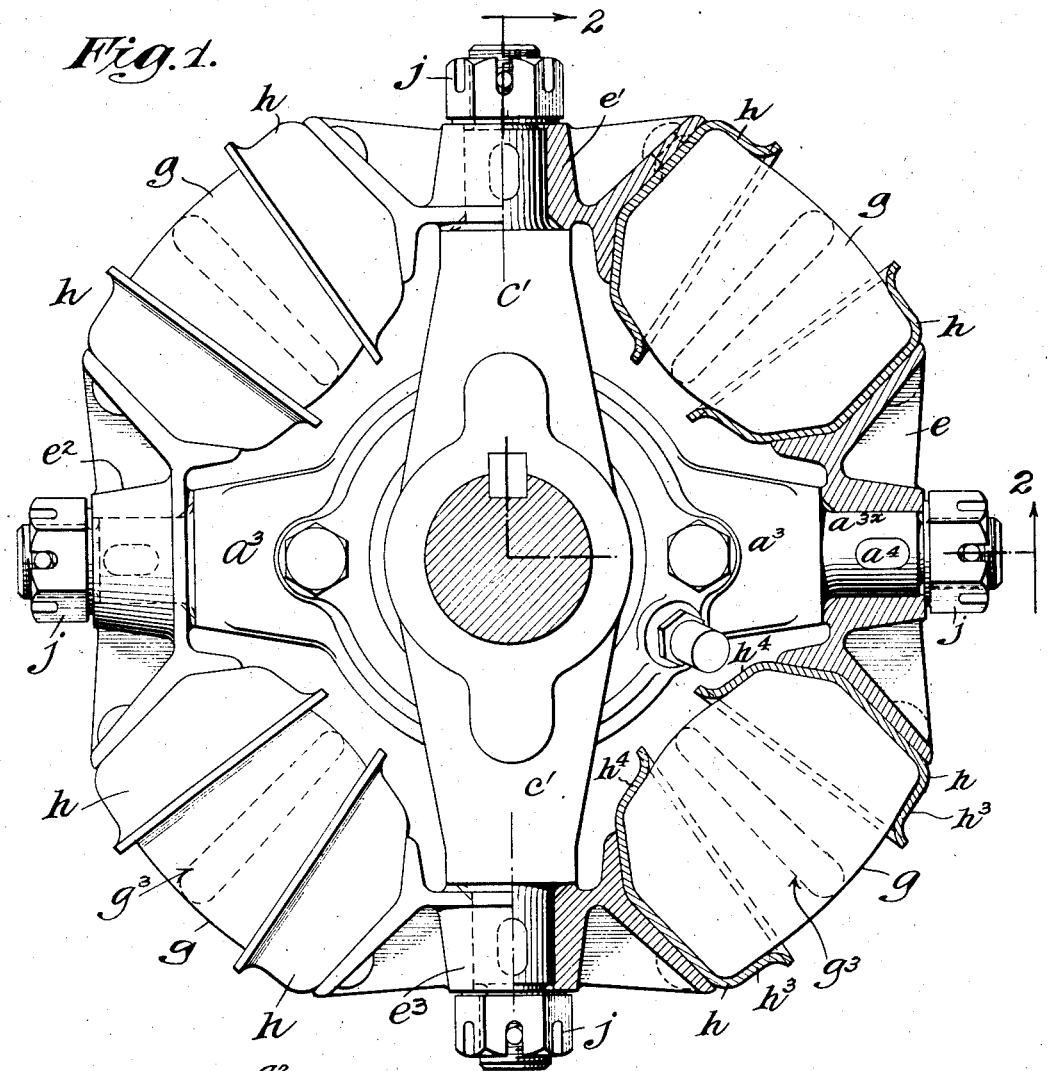
Figure 1 is a view partly in section and partly in elevation of a resilient coupling according to the present invention.
Figure 3:
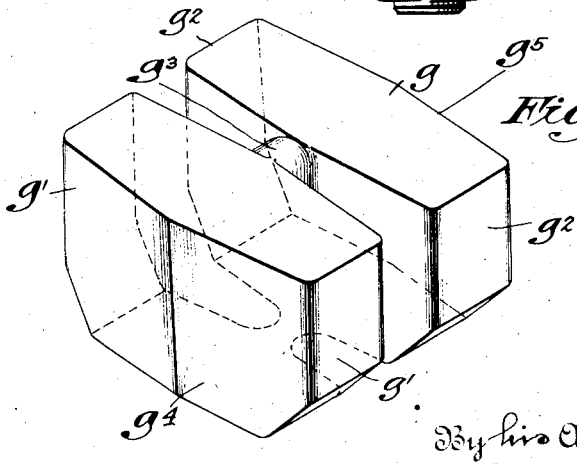
Figure 3 is a view in perspective of one of the blocks.
Figure 2:
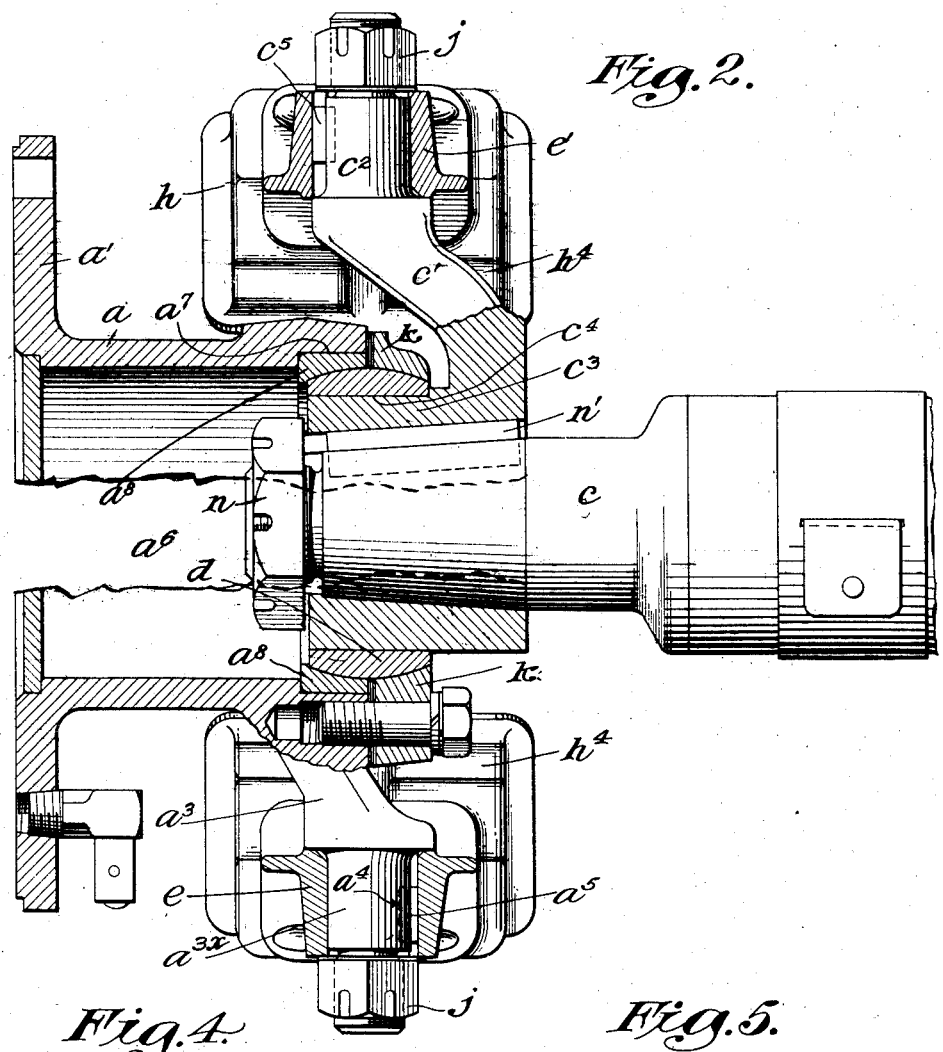
Figure 2 is a view taken along the broken line 2—2 in Figure 1 and looking in the direction of the arrows the driving member being broken in a plane through its axis and an arm carried thereby swung around through 90° to illustrate the construction.
Figure 4:
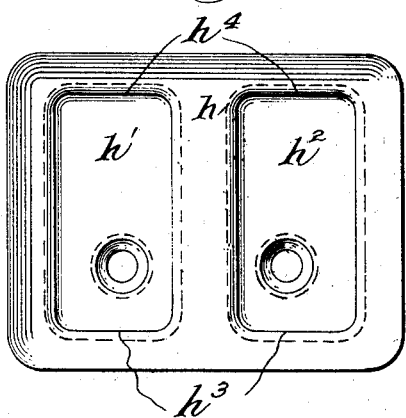
Figure 4 is a top plan view of one of the seats.
Figure 5:
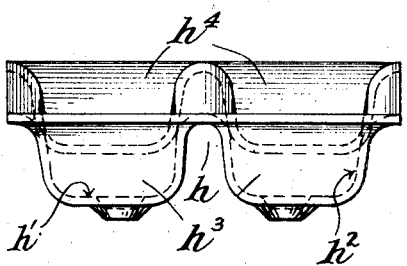
Figure 5 is an end view of the same.

Each of the arms $a^3$, $a^3$, $c'$, $c'$, is adapted to carry at its cylindrical end a yolk, as $e'$, $e^2$, and $e^3$. Riveted to each arm of each yolk is a seat $h$ which is formed, as shown in Figures 4 and 5, with recesses $h'$, $h^2$, to receive the ends $g'$, $g^2$, of the two columns of a block $g$ of yielding non-metallic material, the two columns $g^4$, $g^5$, being joined by a web $g^3$. The yolks are held in position on the turned ends of the arms by means of keys $a^5$, $c^5$, and nuts $j$, the seats carried with the yolks of one pair of arms, of course, opposing those on the other.

To assemble the coupling the hub $c^3$ is first mounted upon the end of the driven member $c$, then the centering ring $d$ is mounted upon the hub and disposed within the spherical ring $a^8$, whereafter the collar $k$ is secured in place by means of bolts. Thus, driving member $a$ and driven member $c$ are centered with respect to one another while at the same time angular motion between the two members is permitted. Then the yolks are placed upon the turned ends of the arms, which are disposed at right angles to one another, with the blocks of yielding non-metallic material $g$ between the seats and the nuts $j$ turned down simultaneously, thereby compressing the blocks. Any desired degree of initial pressure may be obtained by varying the free length of the blocks.

In operation the seats carried with arms on the driving member compress the blocks of yielding non-metallic material, the columns of which lie in planes generally perpendicular to the axis of the coupling, in the direction of rotation towards the driven member thereby transmitting the power to the driven member $c$. Any misalignment or angular motion of the shafts is compensated for within the blocks of yielding non-metallic material between the flanged portions $h^3$, $h^3$ and $h^4$, $h^4$ of the seats as the blocks are retained tightly within the cups by the compression of the rubber. There is no relative motion between the blocks and the cups and consequently no wear takes place, all angular motion being compensated for within the body of the block itself by what is termed the jellying of the yielding non-metallic material.

Since the blocks of yielding non-metallic material $g$ are formed of two columns $g^4$, $g^5$, rather than as a solid block the resistance of the blocks to deflections from the normal alignment of the two members $a$ and $c$ will be relatively much less than the resistance offered by a solid block of the same total cross-sectional area which it would be necessary to provide to afford the same degree of yielding resistance to twisting moments transmitted therethrough, the resistance to deflection varying as the square of the depth of the block as previously set forth.

In order to lessen the cost of manufacture the seats $h$ are stamped or pressed out of sheet metal and are riveted to the yolks, each of which carries two seats. This has been found more expedient than the practice set forth in the co-pending application wherein the seats are cast and formed each with separate bosses for connection with the arms $a^3$, $c'$. Another advantage lies in the fact that the coupling as a whole is lighter in weight and is more easily assembled.

No limitation upon the scope of the invention is intended except as indicated in the following claims:

1. In a resilient coupling, the combination with a pair of shafts, one of which is to be driven by the other, of a plurality of arms carried with the respective shafts, removable seats carried with the arms, and blocks of yielding non-metallic material formed of a plurality of columns joined by a web disposed between the seats.

2. In a resilient coupling, the combination with a pair of shafts, one of which is to be driven by the other, of a plurality of arms carried with the respective shafts, removable seats carried with the arms, and blocks of yielding non-metallic material formed of a plurality of columns joined by a web disposed between the seats, the said columns lying in planes generally perpendicular to the axis of the coupling.

3. In a resilient coupling, the combination with a pair of shafts, one of which is to be driven by the other, of a plurality of arms carried with the respective shafts, removable seats carried with the arms, means to secure the seats to the arms against displacement, and blocks of yielding non-metallic material formed of a plurality of columns joined by a web disposed between the seats, the said columns lying in planes generally perpendicular to the axis of the coupling.

4. In a resilient coupling, the combination with a pair of shafts, one of which is to be driven by the other, of a plurality of arms carried with the respective shafts, removable seats carried with the arms, means to secure the seats to the arms against displacement, and blocks of yielding non-metallic material formed of a plurality of columns joined by a web disposed between the seats, the said columns lying in planes generally perpendicular to the axis of the coupling and said seats being formed with recesses to receive the ends of the columns of the blocks of non-metallic material.

5. In a resilient coupling, the combination with a pair of shafts, one of which is to be driven by the other, of a plurality of arms carried with the respective shafts, removable seats carried with the arms, means to secure the seats to the arms against displacement, and blocks of yielding non-metallic material formed of a plurality of columns joined by a web disposed between the seats, the said columns lying in planes generally perpendicular to the axis of the coupling and said seats being formed with recesses to receive the ends of the columns of the blocks of non-metallic material, said blocks being maintained between the seats under compression, whereby relative movement of the blocks with respect to the seats is prevented.

6. In a resilient coupling, the combination with a pair of shafts one of which is to be driven by the other, diametrically disposed arms carried with the respective shafts at right angles to one another, a removable yoke carried with each of the arms, seats carried with the yokes at the opposite ends thereof, the seats on the yokes carried with the arms on one shaft opposing the seats on the other, recesses formed in the seats, blocks of yielding non-metallic material retained under compression between the seats and being formed of a plurality of columns joined by a web, the ends of said columns being disposed within the recesses in the seats and said columns lying in planes generally perpendicular to the axis of the coupling.

7. In a resilient coupling, the combination with a pair of shafts, one of which is to be driven by the other, of a plurality of seats carried with each shaft, certain of the seats of one shaft being spaced opposite certain of the seats of the other shaft, and a plurality of columns of yielding non-metallic material disposed between each pair of opposed seats.

8. In a resilient coupling, the combination with a pair of shafts, one of which is to be driven by the other, of a plurality of seats carried with each shaft, certain of the seats of one shaft being spaced opposite certain of the seats of the other shaft, and blocks of yielding non-metallic material formed of a plurality of columns disposed between each pair of opposed seats.

9. In a resilient coupling, the combination with a pair of shafts, one of which is to be driven by the other, of a plurality of seats carried with each shaft, certain of the seats of one shaft being spaced opposite certain of the seats of the other shaft, and blocks of yielding non-metallic material formed of a plurality of columns lying in planes transverse to the axis of the shafts disposed between each pair of opposed seats.

10. In a resilient coupling, the combination with a pair of shafts, one of which is to be driven by the other, of a plurality of seats carried with each shaft, certain of the seats of one shaft being spaced opposite certain of the seats of the other shaft, a plurality of columns of yielding non-metallic material disposed between each pair of opposed seats, and a web formed with the columns and joining the columns.

This specification signed this 14th day of July, A. D. 1927.

RAYMOND C. WILSON.